July 31, 1962  C. A. SCHURR  3,047,788
SIGNAL DEVICE
Filed Jan. 26, 1959

INVENTOR.
Charles Allen Schurr,
BY
John H. ...,
his attorney.

United States Patent Office 3,047,788
Patented July 31, 1962

3,047,788
SIGNAL DEVICE
Charles Allan Schurr, Warrensville Heights, Ohio, assignor to Square D Company, Detroit, Mich., a corporation of Michigan
Filed Jan. 26, 1959, Ser. No. 788,975
8 Claims. (Cl. 318—461)

This invention relates to a system for providing a signal representing the relation of voltages in two circuits, and particularly the relative movement between two members responsive to said circuits. The invention is particularly useful in connection with the rotor and stator of an electric machine to provide a signal representing the relative movement between the rotor and stator.

Various systems and devices have been devised for transforming the relative movement between two members into an electrical signal. For example, the rotation of the rotor relative to the stator of an electric motor was formerly transformed into an electrical signal by an ordinary pilot generator or tachometer which produced a signal when it was rotated by the rotor. The signal produced by the tachometer or generator varied in accordance with the speed of rotation and direction of rotation of the rotor relative to the stator. One of the major drawbacks of the tachometer was that it required the use of moving parts and also was driven mechanically by the rotor. In many instances it is inconvenient to use an extra piece of equipment which must be mounted for mechanical rotation by the motor shaft or rotor.

Further, and in many instances wherein the machine or motor is a multiphase wound rotor motor, the motor is located remotely from its control. If the motor is a three phase motor, eight leads are needed between the motor and its control, namely, three leads for the stator, three for the rotor and two for the tachometer. Many times these leads are in the form of expensive collector bars, or the like, particularly when the motors are used in cranes or hoists.

It was apparent that at least two of these leads could be eliminated if a system, which would transform the relative movement of the rotor and stator into an electrical signal, and which would be responsive to electrical conditions appearing at the control, could be devised.

Therefore, one of the objects of the present invention is to devise a new, novel and useful system which transforms the relative movement between the rotor and stator of an electric machine into a signal representing said relative movement.

A further object of the invention is to devise a system for deriving, from the stator and rotor circuits of an electric motor, a signal representing the speed and direction of rotation of the rotor relative to the stator.

A further object of the invention is to devise a static system which provides a signal representing relative movement between two members.

A further object of the inevntion is to provide a static system which is operative to derive a signal representing the relation of the voltages in two multiphase circuits.

Other objects and a fuller understanding of this invention may be had by referring to the following description and claims, taken in conjunction with the accompanying drawings in which:

The objects of the invention are met by the herein claimed system for providing a signal representing the relation of the voltages in two multiphase circuits, or for representing the relative movement between two members, for example, the rotation of the rotor relative to the stator of a multiphase motor. The system described herein, for purpose of exemplification and not of limitation, is used in connection with a motor which has a multiphase stator circuit and stator phase voltages. The motor also has a multiphase rotor circuit and rotor phase voltages. It is noted that the rotor phase voltages are dependent on the speed of rotation of the rotor relative to the stator and also on the stator phase voltages. The system includes a plurality of phase converters, each connectable to its respective one of the multiphase circuits. Each converter provides a single voltage representative of the phase voltages in its respective multiphase circuit. Additional means connect all of the converter means together for deriving, from all of the single voltages, a resultant single signal representing the relation of the voltages in the multiphase circuits. In this instance, a signal representing the rotation of the rotor relative to the stator is derived from all of these single voltages by algebraically adding the voltages together. This algebraic addition may be done by any suitable adder such, for example, as amplifiers or series connected resistors.

Figure 1:
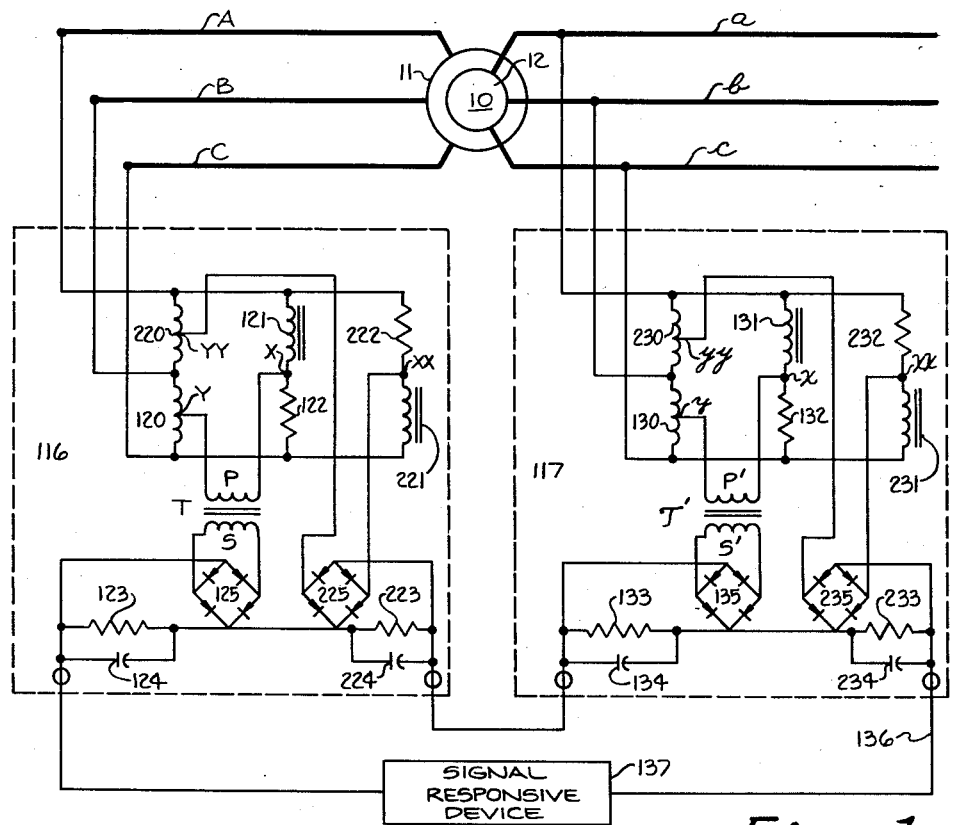
FIG. 1 is a schematic diagram of a system embodying the present invention.

Referring to FIG. 1, a three-phase electric motor 10 has a stator 11 and a rotor 12. The stator 11 is connected in a three-phase stator circuit, defined by phase power lines A, B, and C. Similarly the rotor 12 is connected in a rotor circuit defined by phase lines a, b, and c.

Interconnected with the stator circuit 11 is a phase converter means 116, which provides a single voltage representative of the phase voltages of the stator circuit 11. Interconnected with the rotor circuit 12 is a phase converter means 117, which provides a single voltage representative of the phase voltages of the rotor circuit. As will later be described, these single voltages from the phase converter means 116 and 117 are combined into a signal which represents the relation of the voltages in the multiphase circuits, and in this example, the speed, or direction, or speed and direction of rotation of the rotor 12 relative to the stator 11, or vice versa.

The phase converter means 116 includes two individual converters. The first of these comprises a resistive, capacitive, or inductive voltage divider, for example, inductive coil 120 interconnected between phase line B and phase line C and provided with a center tap Y. Interconnected between the phase lines A and C is a series circuit consisting of an inductor 121 and a resistor 122. The point of connection between the inductor 121 and the resistor 122 is designated as point X and the resistor 122 is between the point X and the phase line C. Electrically interconnected between point Y and the point X is a resistor 123, which is shunted by a condenser 124. The circuit interconnecting the points X and Y with resistor 123 and condenser 124 is completed by connecting the output side of a bridge rectifier 125 in series with the parallel connection of the resistor 123 and condenser 124 and connecting the input side of the bridge rectifier 125 to the secondary S of a transformer T, which has its primary P connected to the points X and Y.

The other of these individual phase converters in phase converter means 116 comprises an inductive coil 220 interconnected between phase line A and phase line B and provided with a center tap YY. Interconnected between the phase lines A and C is a series circuit consisting of an inductor 221 and a resistor 222. The point of connection between the inductor and the resistor is designated as point XX and the resistor 222 is between point XX and phase line A. Electrically interconnected between point YY and the point XX is a resistor 223, which is shunted by a condenser 224. The circuit interconnecting the points XX and YY with resistor 223 and condenser 224 is completed by connecting the output side of a bridge rectifier 225 in series with the parallel connection of the resistor 223 and the condenser 224, and connecting the input side of the bridge rectifier 225 across the points XX and YY. No transformer is needed between rectifier 225 and points XX and YY since transformer T isolates rectifier bridge 125 from points X and Y, insofar as flow of unidirectional current is concerned. Only one transformer is needed in the phase converter means 116 to prevent unidirectional current flow from one rectifier bridge through the other rectifier bridge and the coils and resistors connected across the phase lines A, B, and C.

Similarly, the phase converter means 117 comprises two individual phase converters. The first of these comprises a voltage divider for example, inductive coil 130 interconnected between phase line $b$ and phase line $c$, and provided with a center tap $y$. Interconnected between the phase lines $a$ and $c$ is a series circuit consisting of an inductor 131 and a resistor 132. The point of connection between the inductor and the resistor is designated as point $x$ and the resistor 132 is between the point $x$ and the phase line $c$. Electrically interconnected between the point $x$ and the point $y$ is a resistor 133, shunted by a condenser 134. The circuit interconnecting the points $x$ and $y$ with resistor 133 and condenser 134 is completed by connecting the output side of a bridge rectifier 135 in series with the parallel connection of the resistor 133 and condenser 134 and connecting the input side of the bridge rectifier to the secondary S′ of a transformer T′, which has its primary P′ connected to the points $x$ and $y$.

The other of these individual phase converters in phase converter means 117 comprises an inductive coil 230 interconnected between phase line $a$ and phase line $b$ and provided with a center tap $yy$. Interconnected between the phase lines $a$ and $c$ is a series circuit consisting of an inductor 231 and a resistor 232. The point of connection between the inductor 231 and the resistor 232 is designated as point $xx$ and the resistor 232 is between point $xx$ and phase line $a$. Electrically interconnected between point $yy$ and the point $xx$ is a resistor 233, shunted by a condenser 234. The circuit interconnecting the points $xx$ and $yy$ with resistor 233 and condenser 234 is completed by connecting the output side of a bridge rectifier 235 in series with the parallel connection of the resistor 233 and the condenser 234 and connecting the input side of the bridge rectifier across the points $xx$ and $yy$.

To obtain a signal representing the relation of the voltages in the multiphase circuits, or, in this example, the rotation of the rotor 12 relative to the stator 11, the resistors 123, 223, 133, and 233 are connected in an electrical series circuit by a connector means 136 so that the voltage drops thereacross will be algebraically additive. In this way, the resultant voltage from algebraically adding the individual drops across the resistors and connection 136 provides a D.C. speed signal, or a D.C. voltage, which represents the speed, or direction of rotation, or both, of the rotor relative to the stator. In FIG. 1, a signal responsive device 137 receives this speed signal. This device 137 may be a D.C. voltmeter calibrated in speed, or it may be a device for controlling an extraneous apparatus in accordance with the speed of the motor 10.

Figure 2:
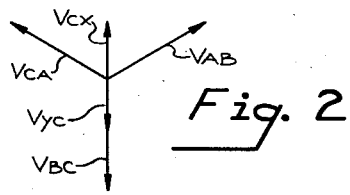
FIG. 2 is a vector representation of the phase voltages in the stator circuit of FIG. 1 for one direction of phase rotation.
Figure 3:
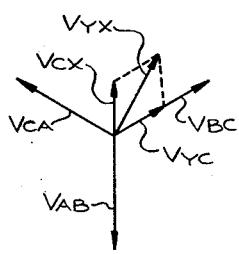
FIG. 3 is a vector representation of the phase voltages in the stator circuit of FIG. 1 for a direction of phase rotation opposite that of FIG. 2.

FIG. 2 illustrates, in vector form, the individual voltages appearing at various points or locations in the stator circuit of FIG. 1 for one direction of phase rotation. FIG. 3 illustrates the individual voltages for the direction of phase rotation opposite that of FIG. 2, and at the same locations in the stator circuit of FIG. 1. In these figures, arrows $V_{AB}$, $V_{BC}$, $V_{CA}$, $V_{YC}$, $V_{CX}$, and $V_{YX}$ represent the magnitudes of the voltages appearing between the respective phases or points identified by the sub letters postscripting the letter V. With one direction of phase rotation in the stator circuit there is no voltage between points Y and X, while with an opposite direction of phase rotation in the stator circuit there is a voltage $V_{YX}$ between points Y and X. In each case, the voltage $V_{YX}$ is equal to the voltage $V_{YC}$ plus the voltage $V_{CX}$.

In one direction of phase rotation, and when the phase voltages $V_{CA}$, $V_{AB}$, and $V_{BC}$ are 60 cycles A.-C. and the inductors, resistors, and inductive coils are of correct magnitude to make the voltage $V_{CX}$ lag the voltage $V_{CA}$ by sixty (60°) degrees, the voltage $V_{YX}$ is zero (0). This is because the voltage $V_{YC}$ is in phase with voltage $V_{BC}$ and one hundred eighty (180°) degrees out of phase with voltage $V_{CX}$.

In the opposite direction of phase rotation, and when the phase voltages $V_{CA}$, $V_{AB}$, and $V_{BC}$ are 60 cycle A.-C. and the inductors, resistors, and inductive coils are of correct magnitude to make the voltage $V_{CX}$ lag the voltage $V_{CA}$ by sixty (60°) degrees, the voltage $V_{YX}$ is equal to $\sqrt{3/2}$, or .867 times one of the phase voltages $V_{CA}$, $V_{AB}$, or $V_{BC}$ (see FIG. 3).

Similarly and simultaneously, the other individual converter of converter means 116 produces voltage $V_{YYXX}$ which has a magnitude of either zero or $\sqrt{3/2}$ times the phase voltage $V_{AB}$, depending on the direction of phase rotation in the stator circuit, and providing the power factors in both individual converters are the same. Furthermore, when the voltage $V_{YX}$ is zero, the voltage $V_{YYXX}$ is .867 $V_{AB}$, and vice versa.

The converter means 117 operates similarly to the converter means 116, and, therefore, will not be described in detail. The frequency of the phase voltages in the rotor circuit varies in accordance with the direction of phase rotation of the stator voltages, the direction of rotation of the rotor and the speed of rotation of the rotor. The values of the voltages $V_{yx}$ and $V_{yyxx}$ vary when the frequency varies and are at least partly dependent on the values of the resistors, inductors, and inductive coils in the converter means 117.

The voltages $V_{YX}$, $V_{YYXX}$, $V_{yx}$ and $V_{yyxx}$ appear in rectified form across the resistors 123, 223, 133 and 233, respectively. The algebraic sum of these voltages is obtained at signal responsive device 137 by the interconnecting of the resistors 123, 223, 133 and 233 with the connector 136. The final signal is, in this instance, a voltage signal which varies in polarity and magnitude in accordance with changes in speed and direction of rotation of the rotor and independently of the phase rotation of the stator voltages.

Figure 4:
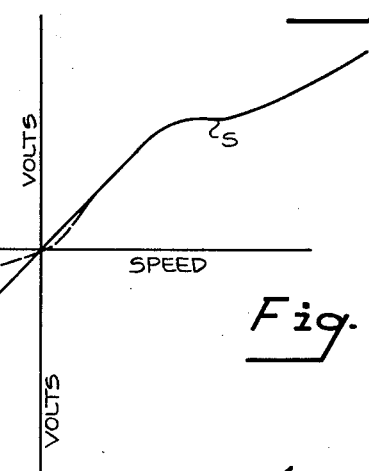
FIG. 4 is a graph illustrating the magnitude of the signal in the signal responsive device relative to the speed of rotation of the rotor for both positive and negative directions of rotation.

The graph of FIG. 4 illustrates the relationship between the speed of rotation of the rotor relative to the stator and the signal voltage. When the resistors, inductors, and inductive coils in converter means 117 are of values based on one frequency, a signal S is obtained, and when the values are based on another frequency, a signal S′ is obtained.

In this example, the signal or curve S′ represents a condition wherein the resistors and inductors are tuned for a 60° lag of the voltage $V_{cx}$ behind voltage $V_{ca}$ when the rotor frequency is 60 cycles per second. The curve S represents a condition wherein the resistors and inductors are tuned for a 60° lag of the voltage $V_{cx}$ behind voltage $V_{ca}$ when the rotor frequency is 120 cycles per second.

The graph illustrates that a signal in volts will appear as positive or negative and unidirectional, depending on the direction of rotation of the rotor with respect to the stator. Thus a new and novel system for providing a signal representing the relation of voltages in two circuits is useful.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

Having thus described my invention, I claim:

1. In a signal system, a plurality of multiphase circuits, a plurality of phase converter means electrically connected in parallel with said multiphase circuits, respectively, each phase converter means including output devices operative, when the converter means is energized, to provide output voltages representative of the phase voltages in the multiphase circuits, respectively, additional circuit means serially connecting all of said output devices together whereby a resultant single voltage signal representing the algebraic summation of said output voltages is provided.

2. The structure according to claim 1 wherein each of said output devices comprises a resistor and a capacitor connected in parallel with each other, the parallel connections being serially connected by said additional circuit means.

3. In combination, a multiphase source, a multiphase motor including a multiphase stator circuit connected to said source, a multiphase rotor circuit providing rotor phase voltages dependent on the speed of rotation of the rotor relative to the stator and on the stator phase voltages, a plurality of phase converter means electrically connected in parallel to said multiphase circuits, respectively, each converter means including output devices operative, when said converter means is energized, to provide output voltages representative of the phase voltages in the multiphase circuits, respectively, and additional circuit means serially connecting all of said output means together, whereby all of said output voltages are combined in algebraic summation to produce a resultant signal voltage representing the relation of said voltages, and thus representing the rotation of the rotor relative to the stator.

4. The structure according to claim 3 wherein said output devices are connected across rectifiers provided in each of said converter means, respectively, to convert output voltage into a unidirectional voltage.

5. The structure according to claim 3 wherein each of said output devices comprises a resistor and a capacitor connected in parallel with each other, the parallel connections being serially connected by said additional circuit means.

6. The structure according to claim 3 wherein each converter means comprises a plurality of individual converters and each converter comprises the following: a serially connected resistance and inductance connected across a phase of the source associated with their converter, a voltage divider having a center tap and connected across another phase of said associated source, rectifier means having input terminals electrically connected, respectively, to said center tap and to a point between said inductance and resistance, and having output terminals connected to their associated output device whereby said output voltage is provided in the form of a D.-C. voltage of a magnitude dependent upon the magnitude and angular displacement of the phase voltages of the associated source, and a polarity representative of the phase rotation of the voltages of said associated source.

7. The structure according to claim 3 wherein each converter means is operable to provide an output voltage proportional to the phase voltages from which the output voltage is derived, whereby said resultant signal voltage represents both the speed and the direction of rotation of the rotor relative to the stator.

8. A system for providing a signal representing the speed and direction of rotation of the rotor relative to the stator of a multiphase motor, said system comprising a multiphase stator circuit whereby, when the motor is connected to a source of multiphase voltage, the angular displacement of the phase voltages is in a predetermined direction of phase rotation, a multiphase rotor circuit operable by energization of the stator circuit to produce phase voltages angularly displaced in a direction of phase rotation dependent on the speed of rotation of said rotor relative to said stator and the said direction of phase rotation of the phase voltages in said stator circuit, first means energized by the voltages in said stator circuit and operable when so energized to provide a first voltage of a magnitude dependent on the magnitude of the phase voltages in said stator circuit and of a phase angularly displaced in said predetermined direction of rotation from any one of the phase voltages in said stator circuit, a second means energized by the voltages in said stator circuit and operable when so energized to provide a second voltage of a magnitude dependent on the magnitude of the phase voltages in said stator circuit and of a phase angularly displaced in said predetermined direction of rotation from another of said phase voltages of said stator circuit, third means energized by said first and second voltages and operable when so energized to provide a third voltage of a polarity and magnitude dependent on the phase and magnitude of said first and second voltages, fourth means energized by the voltages in said rotor circuit and operable when energized to provide a fourth voltage of a magnitude dependent on the magnitude of the phase voltages in said rotor circuit and of a phase angularly displaced in said direction of phase rotation from any one of the phase voltages of said rotor circuit, fifth means energized by the voltages in said rotor circuit and operable, when so energized, to provide a fifth voltage of a magnitude dependent on the magnitude of the phase voltages in said rotor circuit and of a phase angularly displaced in said direction of phase rotation from another of said phase voltages of said rotor circuit, sixth means energized by said fourth and fifth voltages and operable, when so energized, to provide a sixth voltage of a polarity and magnitude dependent on the phase and magnitude of said fourth and fifth voltages, and combining means interconnected with said third and sixth means so as to combine said third and sixth voltages into a common signal representing the speed of rotation of the rotor relative to the stator.

No references cited.